US009389764B2

(12) United States Patent
Hoover et al.

(10) Patent No.: US 9,389,764 B2
(45) Date of Patent: Jul. 12, 2016

(54) TARGET DISAMBIGUATION AND CORRECTION

(75) Inventors: Paul Armistead Hoover, Bothell, WA (US); Michael J. Patten, Sammamish, WA (US); Theresa B. Pittappilly, Redmond, WA (US); Jan-Kristian Markiewicz, Redmond, WA (US); Adrian J. Garside, Sammamish, WA (US); Maxim V. Mazeev, Redmond, WA (US); Jarrod Lombardo, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 856 days.

(21) Appl. No.: 13/117,964

(22) Filed: May 27, 2011

(65) Prior Publication Data

US 2012/0304061 A1 Nov. 29, 2012

(51) Int. Cl.
*G06F 3/0484* (2013.01)
*G06F 3/0488* (2013.01)

(52) U.S. Cl.
CPC .......... *G06F 3/04842* (2013.01); *G06F 3/0488* (2013.01); *G06F 2203/04805* (2013.01)

(58) Field of Classification Search
CPC .................................................. G06F 3/04842
USPC ...................................................... 715/711
See application file for complete search history.

(56) References Cited

U.S. PATENT DOCUMENTS

| 5,572,237 | A | * | 11/1996 | Crooks | G06F 1/1616 345/156 |
| 5,627,567 | A | * | 5/1997 | Davidson | G06F 3/0488 345/170 |
| 6,211,856 | B1 | * | 4/2001 | Choi | G06F 3/0481 345/173 |
| 6,259,436 | B1 | * | 7/2001 | Moon | G06F 3/0488 345/173 |
| 7,103,852 | B2 | * | 9/2006 | Kairis, Jr. | G06F 3/0418 345/173 |

(Continued)

FOREIGN PATENT DOCUMENTS

CN 101957720 A 1/2011
EP 2352079 A1 8/2011

(Continued)

OTHER PUBLICATIONS

"International Search Report", Mailed Date: May 17, 2012, Application No. PCT/US2011/055510, Filed Date: Oct. 9, 2011, pp. 9.

(Continued)

*Primary Examiner* — Reza Nabi
(74) *Attorney, Agent, or Firm* — Jim Banowsky; Leonard Smith; Micky Minhas

(57) ABSTRACT

Various embodiments enable target disambiguation and correction. In one or more embodiments, target disambiguation includes an entry mode in which attempts are made to disambiguate one or more targets that have been selected by a user, and an exit mode which exits target disambiguation. Entry mode can be triggered in a number of different ways including, by way of example and not limitation, acquisition of multiple targets, selection latency, a combination of multiple target acquisition and selection latency, and the like. Exit mode can be triggered in a number of different ways including, by way of example and not limitation, movement of a target selection mechanism outside of a defined geometry, speed of movement of the target selection mechanism, and the like.

20 Claims, 12 Drawing Sheets

(56) References Cited

U.S. PATENT DOCUMENTS

| | | | | |
|---|---|---|---|---|
| 7,158,123 B2* | 1/2007 | Myers | G06F 3/0421 | 345/173 |
| 7,535,461 B2* | 5/2009 | Ito | G06F 3/038 | 345/173 |
| 7,692,629 B2* | 4/2010 | Baudisch | G06F 3/0488 | 345/157 |
| 7,694,231 B2* | 4/2010 | Kocienda | G06F 3/04886 | 341/20 |
| 7,880,720 B2* | 2/2011 | Hill | G06F 3/0421 | 345/156 |
| 8,345,008 B2* | 1/2013 | Lee | G06F 3/04886 | 345/168 |
| 8,390,587 B2* | 3/2013 | Fan | G06F 3/044 | 178/18.06 |
| 8,812,995 B1* | 8/2014 | Murphy | G06F 3/0488 | 715/764 |
| 9,001,059 B2* | 4/2015 | Wibbeler | G06F 3/0488 | 345/173 |
| 9,019,210 B2* | 4/2015 | Qian | G06F 3/0236 | 345/173 |
| 2003/0056384 A1* | 3/2003 | Masley | A41D 19/046 | 33/512 |
| 2004/0004632 A1* | 1/2004 | Knight | G06F 3/04812 | 715/711 |
| 2004/0212616 A1* | 10/2004 | Uthe | G06T 11/206 | 345/440 |
| 2006/0079269 A1* | 4/2006 | Sorotzkin | H04M 1/0214 | 455/550.1 |
| 2006/0161846 A1* | 7/2006 | Van Leeuwen | G06F 3/04842 | 715/702 |
| 2007/0046641 A1* | 3/2007 | Lim | G06F 3/04886 | 345/173 |
| 2007/0152978 A1* | 7/2007 | Kocienda | G06F 3/04886 | 345/173 |
| 2007/0229476 A1* | 10/2007 | Huh | G06F 3/04886 | 345/173 |
| 2007/0245241 A1* | 10/2007 | Bertram | G06F 3/0481 | 715/711 |
| 2007/0247435 A1* | 10/2007 | Benko | G06F 3/0488 | 345/173 |
| 2008/0096610 A1* | 4/2008 | Shin | G06F 3/04886 | 455/566 |
| 2008/0136785 A1* | 6/2008 | Baudisch | G06F 3/0488 | 345/173 |
| 2008/0165133 A1 | 7/2008 | Blumenberg et al. | | |
| 2008/0222567 A1* | 9/2008 | Thoresson | G06F 3/0481 | 715/823 |
| 2009/0228837 A1* | 9/2009 | Suzuki | B60K 35/00 | 715/841 |
| 2009/0319935 A1* | 12/2009 | Figura | G06F 3/0237 | 715/773 |
| 2010/0083111 A1 | 4/2010 | de los Reyes | | |
| 2010/0103439 A1* | 4/2010 | Zak | H04N 1/00466 | 358/1.9 |
| 2010/0105443 A1* | 4/2010 | Vaisanen | G06F 3/0486 | 455/566 |
| 2010/0251161 A1* | 9/2010 | Fong | G06F 3/04886 | 715/773 |
| 2010/0251176 A1* | 9/2010 | Fong | G06F 3/04886 | 715/821 |
| 2011/0006981 A1 | 1/2011 | Chtchetinine et al. | | |
| 2011/0016422 A1* | 1/2011 | Miyazawa | G06F 3/0488 | 715/788 |
| 2011/0043455 A1* | 2/2011 | Roth | G06F 3/0488 | 345/173 |
| 2011/0083105 A1* | 4/2011 | Shin | G06F 17/24 | 715/830 |
| 2011/0128249 A1* | 6/2011 | Fan | G06F 3/044 | 345/174 |
| 2012/0001923 A1* | 1/2012 | Weinzimmer | G06F 3/013 | 345/473 |
| 2012/0043142 A1* | 2/2012 | Grivna | G06F 3/044 | 178/19.03 |
| 2012/0212438 A1* | 8/2012 | Vaisanen | G06F 3/0486 | 345/173 |
| 2012/0218231 A1* | 8/2012 | Slaby | G06F 3/04886 | 345/178 |
| 2013/0201110 A1* | 8/2013 | Griffin | G06F 1/1626 | 345/169 |
| 2013/0285918 A1* | 10/2013 | Griffin | G06F 1/1626 | 345/169 |

FOREIGN PATENT DOCUMENTS

| | | |
|---|---|---|
| JP | 2007334025 A | 12/2007 |
| JP | 2011081676 A | 4/2011 |
| JP | 2011197719 A | 10/2011 |
| JP | 2012505443 A | 3/2012 |
| JP | 2012521603 A | 9/2012 |
| KR | 1020110037298 A | 4/2011 |
| TW | 563870 U | 11/2003 |
| TW | I292120 B | 1/2008 |
| WO | 2008070815 A1 | 6/2008 |
| WO | 2009044770 A1 | 4/2009 |
| WO | 2009069392 A1 | 6/2009 |
| WO | 2010050475 A1 | 5/2010 |
| WO | 2010110999 A2 | 9/2010 |

OTHER PUBLICATIONS

Roudaut, et al., "TapTap and MagStick: Improving One-Handed Target Acquisition on Small Touch-screens", Retrieved at <<http://citeseerx.ist.psu.edu/viewdoc/download?doi=10.1.1.180.1024&rep=rep1&type=pdf>>, The International Conference on Advanced Visual Interfaces, May 28-30, 2008, pp. 8.

Yatani, et al., "Escape: A Target Selection Technique Using Visually-cued Gestures", Retrieved at <<http://yatani.jp/paper/CHI2008.pdf>>, Proceeding of the twenty-sixth annual SIGCHI conference on Human factors in computing systems, Apr. 5-10, 2008, pp. 10.

Wang, et al., "Detecting and Leveraging Finger Orientation for Interaction with Direct-Touch Surfaces", Retrieved at <<http://research.microsoft.com/en-us/people/xiangc/uist2009_fingerorientation.pdf>>, Proceedings of the 22nd annual ACM symposium on User interface software and technology, Oct. 4-7, 2009, pp. 23-32.

"European Search Report Received for European Patent Application No. 11867035.5", Mailed Date: Nov. 21, 2014, 7 Pages.

Office Action and Search Report Issued in Taiwan Application No. 100136560, Mailed Date: Nov. 26, 2015, 11 Pages.

First Office Action and Search Report Issued in Chinese Application No. 201180071182.6, Mailed Date: Sep. 2, 2015, 14 Pages.

Office Action Issued in Japanese Application No. 2014-512818, Mailed Date: Sep. 29, 2015, 5 Pages. (W/O English Translation).

Office Action Issued in Japanese Patent Application No. 2014-512818, Mailed Date: Mar. 8, 2016, 5 Pages.

Office Action Issued in Taiwan Patent Application No. 100136560, Mailed Date: Jan. 30, 2016, 7 Pages.

Second Office Action Issued in Chinese Patent Application No. 201180071182.6, Mailed Date: May 3, 2016, 7 Pages.

* cited by examiner

TARGET DISAMBIGUATION AND CORRECTION

BACKGROUND

On various screens, such as touch screens as well as other screens, a target that a user is trying to acquire can sometimes be smaller than the footprint of the mechanism through which the user is attempting target acquisition. For example, in touch screen scenarios, the target may be smaller than the tip of the user's finger. This can pose to problems. First, the target can be visually occluded, thus making it difficult to ascertain whether the correct target has been selected. Second, because targets may be small in size, there is a possibility that more than one target may be selected, thus leading to an ambiguity which, in turn, can lead to false target acquisition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments enable target disambiguation and correction. In one or more embodiments, target disambiguation includes an entry mode in which attempts are made to disambiguate one or more targets that have been selected by a user, and an exit mode which exits target disambiguation. Entry mode can be triggered in a number of different ways including, by way of example and not limitation, acquisition of multiple targets, selection latency, a combination of multiple target acquisition and selection latency, and the like. Exit mode can be triggered in a number of different ways including, by way of example and not limitation, movement of a target selection mechanism outside of a defined geometry, speed of movement of the target selection mechanism, and the like.

In one or more embodiments, target disambiguation techniques utilize a geometric-based approach to define when to initiate target disambiguation and terminate target disambiguation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable target disambiguation and correction. In one or more embodiments, target disambiguation includes an entry mode in which attempts are made to disambiguate one or more targets that have been selected by a user, and an exit mode which exits target disambiguation. Entry mode can be triggered in a number of different ways including, by way of example and not limitation, acquisition of multiple targets, selection latency, a combination of multiple target acquisition and selection latency, and the like. For example, multiple targets can be acquired when, for example, a user's finger overlaps with two or more targets in a touch-screen environment. Selection latency can occur, for example, if a user's finger lingers too long, e.g., two or more seconds, over one or more touch-selected targets.

Exit mode can be triggered in a number of different ways including, by way of example and not limitation, movement of a target selection mechanism outside of a defined geometry, speed of movement of the target selection mechanism, and the like.

In one or more embodiments, target disambiguation techniques utilize a geometric-based approach to define when to initiate target disambiguation and terminate target disambiguation.

In the following discussion, an example environment is first described that is operable to employ the techniques described herein. Next, a section entitled "Target Disambiguation" describes aspects of target disambiguation in accordance with one or more embodiments. Following this, a section entitled "Using Geometry to Initiate/Terminate Target Disambiguation" describes how geometry can be employed to disambiguate item selection ambiguities. Last, a section entitled "Example Device" describes aspects of an example device that can be utilized to implement one or more embodiments.

Example Environment

Figure 1:
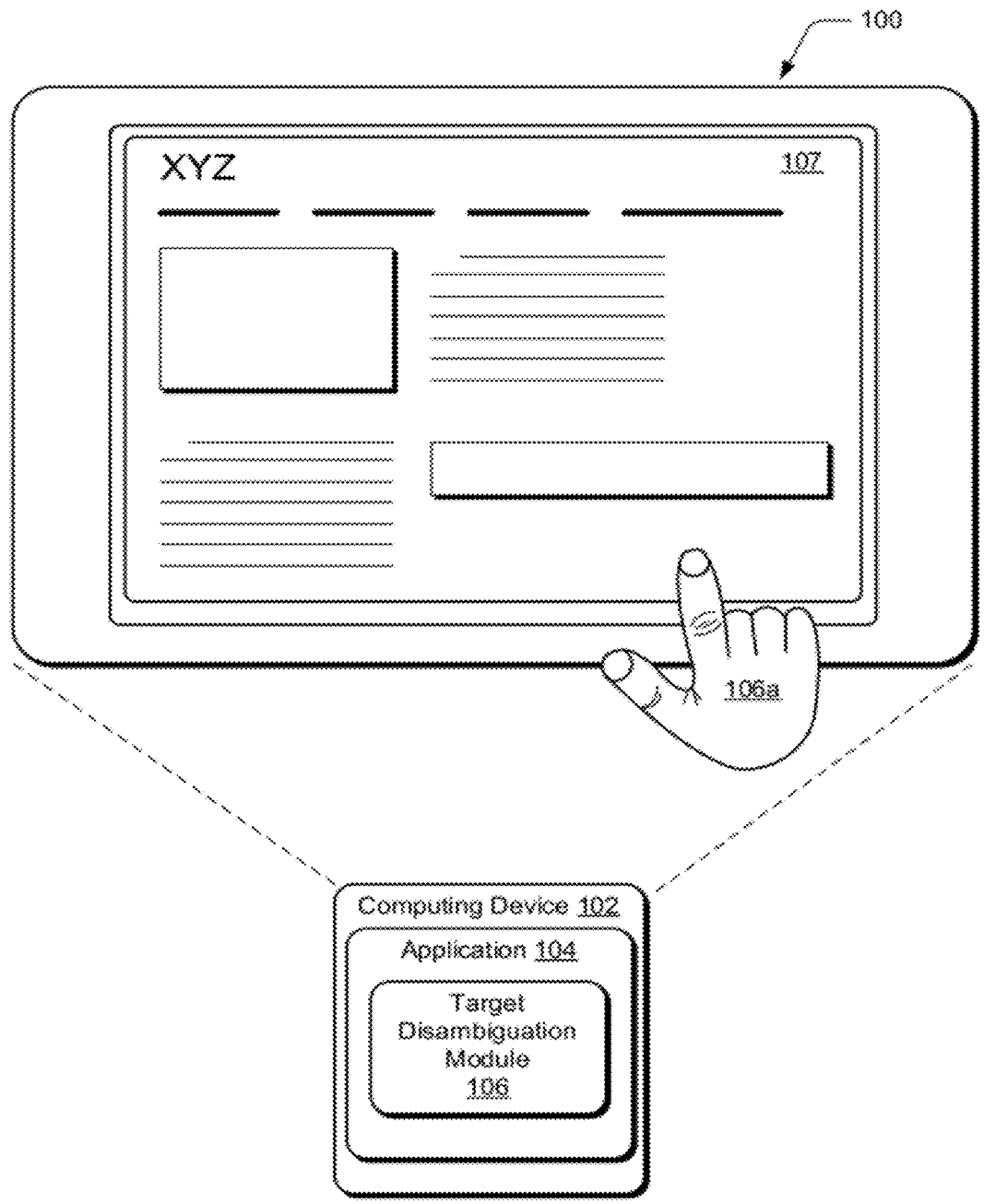
FIG. 1 is an illustration of an environment in an example implementation in accordance with one or more embodiments.

FIG. 1 is an illustration of an environment 100 in an example implementation that is operable to employ the target disambiguation techniques as described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. In one or more embodiments, the computing device is embodied as a slate-type or tablet-type form factor device that can typically be held by a user in one hand, and interacted with using the other hand. In at least some embodiments, the computing device includes touch-screen functionality that enables a user to touch-select items that are displayed.

Thus, the computing device 102 may range from full resource devices with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described below.

Computing device 102 includes one or applications 104 that are operational to provide various types of application functionality. One type of application is a web browser that provides web browsing functionality as described in this document. The applications can be implemented in connection with any suitable type of hardware, software, firmware or combination thereof. In at least some embodiments, application 104 is implemented in software that resides on some type of tangible, computer-readable medium examples of which are provided below.

Application 104 includes or otherwise makes use of, in this example, a target disambiguation module 106 that operates as described above and below.

Target disambiguation module 106 is representative of functionality that can utilize recognized gestures that can be employed to select a target, such as a link or other object, and then employ target disambiguation techniques as described below.

Gestures may be recognized by the computing device, using a suitably configured gesture module, in a variety of different ways. The gesture module can be a separate module which recognizes gestures and then passes associated events to other components (e.g., a layout engine) and/or applications. For example, the gesture module may be configured to recognize a touch input, such as a finger of a user's hand 106a as proximal to display device 107 of the computing device 102 using touch screen functionality. Alternately or additionally, the computing device 102 may be configured to detect and differentiate between a touch input (e.g., provided by one or more fingers of the user's hand 106a) and a stylus input provided by a stylus. The differentiation may be performed in a variety of ways, such as by detecting an amount of the display device 107 that is contacted by the finger of the user's hand 106a versus an amount of the display device 107 that is contacted by the stylus.

Thus, the gesture module may support a variety of different gesture techniques through recognition and leverage of a division between stylus and touch inputs, as well as different types of touch inputs and gestural inputs other than gestural inputs that use a touch screen or touch display, in the context of any of the computing devices described above and below.

Target disambiguation module 106 can be utilized to enable target disambiguation and correction. In one or more embodiments, target disambiguation includes an entry mode in which attempts are made to disambiguate one or more targets that have been selected by a user, and an exit mode which exits target disambiguation. Entry mode can be triggered in a number of different ways including, by way of example and not limitation, acquisition of multiple targets, selection latency, a combination of multiple target acquisition and selection latency, and the like. Exit mode can be triggered in a number of different ways including, by way of example and not limitation, movement of a target selection mechanism outside of a defined geometry, speed of movement of the target selection mechanism, and the like. In one or more embodiments, target disambiguation techniques utilize a geometric-based approach to define when to initiate target disambiguation and terminate target disambiguation.

Figure 2:
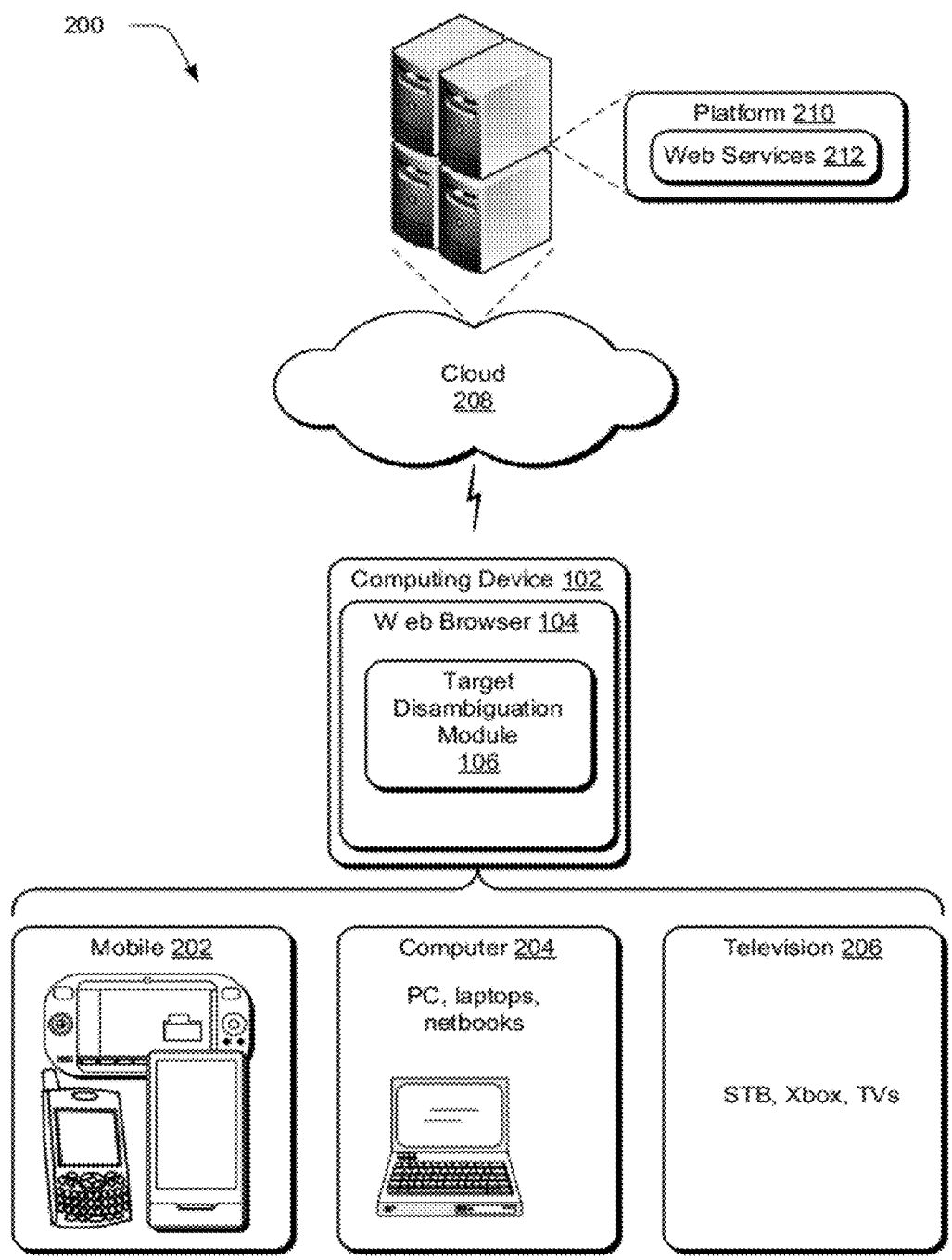
FIG. 2 is an illustration of a system in an example implementation showing FIG. 1 in greater detail.

FIG. 2 illustrates an example system 200, showing the application 104 in the form of a web browser, as being implemented in an environment where multiple devices are interconnected through a central computing device. Although application 104 is illustrated as a Web browser, it is to be appreciated and understood that this is for purposes of example. Accordingly, other applications can be utilized without departing from the spirit and scope of the claimed embodiments. The other applications can be used in connection with any of the computing devices described above and below.

The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size or form factor and thus the computing device 102 may be configured as one of these device classes in this example system 200. For instance, the computing device 102 may assume the mobile 202 class of device which includes mobile telephones, music players, game devices, slate-type or tablet-type form factor devices and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The disambiguation techniques supported by the disambiguation module 106 may be employed using touch screen functionality in the mobile configuration 202, track pad functionality of the computer 204 configuration, detected by a camera as part of support of a natural user interface (NUI) that does not involve contact with a specific input device, and so on.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Having considered example environments in which the various embodiments can be employed, consider now a discussion of target disambiguation in accordance with one or more embodiments.

Target Disambiguation

As noted above, various embodiments enable target disambiguation and correction. In one or more embodiments, target disambiguation includes an entry mode in which attempts are made to disambiguate one or more targets that have been selected by a user, and an exit mode which exits target disambiguation. Entry mode can be triggered in a number of different ways including, by way of example and not limitation, acquisition of multiple targets, selection latency, a combination of multiple target acquisition and selection latency, and the like. For example, multiple targets can be acquired when, for example, a user's finger overlaps with two or more targets in a touch-screen environment. Selection latency can occur, for example, if a user's finger lingers too long, e.g., two or more seconds, over one or more touch-selected targets. Exit mode can be triggered in a number of different ways including, by way of example and not limitation, movement of a target selection mechanism outside of a defined geometry, speed of movement of the target selection mechanism, and the like.

In the discussion that follows, various sub-sections discuss target disambiguation in the context of various approaches that can be used. A first sub-section discusses the notion of multiple target acquisition as a way to initiate target disambiguation. Following this, a second sub-section discusses the notion of selection latency as a way to initiate target disambiguation.

Multiple Target Acquisition

Figure 3:
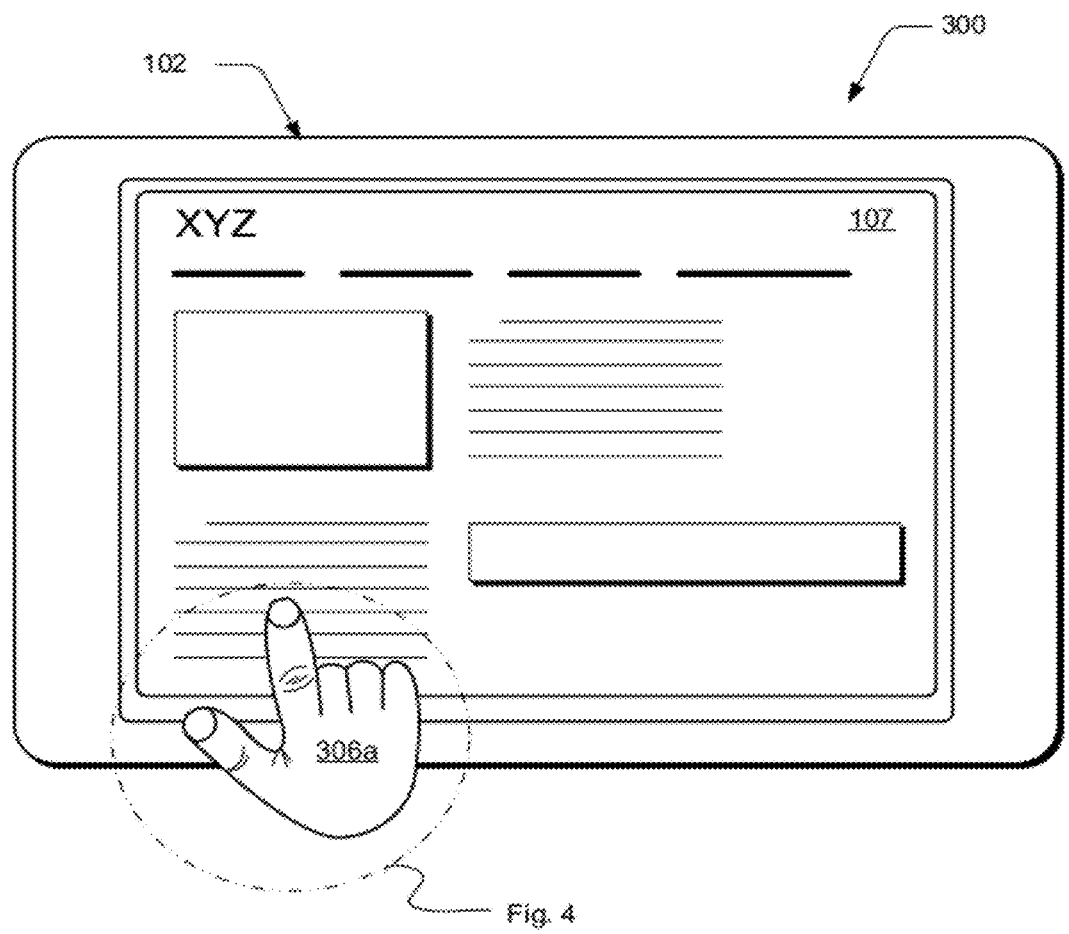
FIG. 3 illustrates an example computing device in accordance with one or more embodiments.

As an example, consider FIG. 3, which illustrates target disambiguation techniques in an example environment 300 that includes a computing device 102 having a display device 107 with touchscreen functionality. Here, a user's hand can touch-select one or more items or "targets" that are displayed as part of a webpage. In certain circumstances, the manner in which one or more of these items are touch-selected can lead to an ambiguity with respect to whether a user has made a selection or not. Consider first a situation in which a user's touch-engagement on display device 107 results in an engagement of two or more items. In this particular example, the items reside in the form of links.

Figure 4:
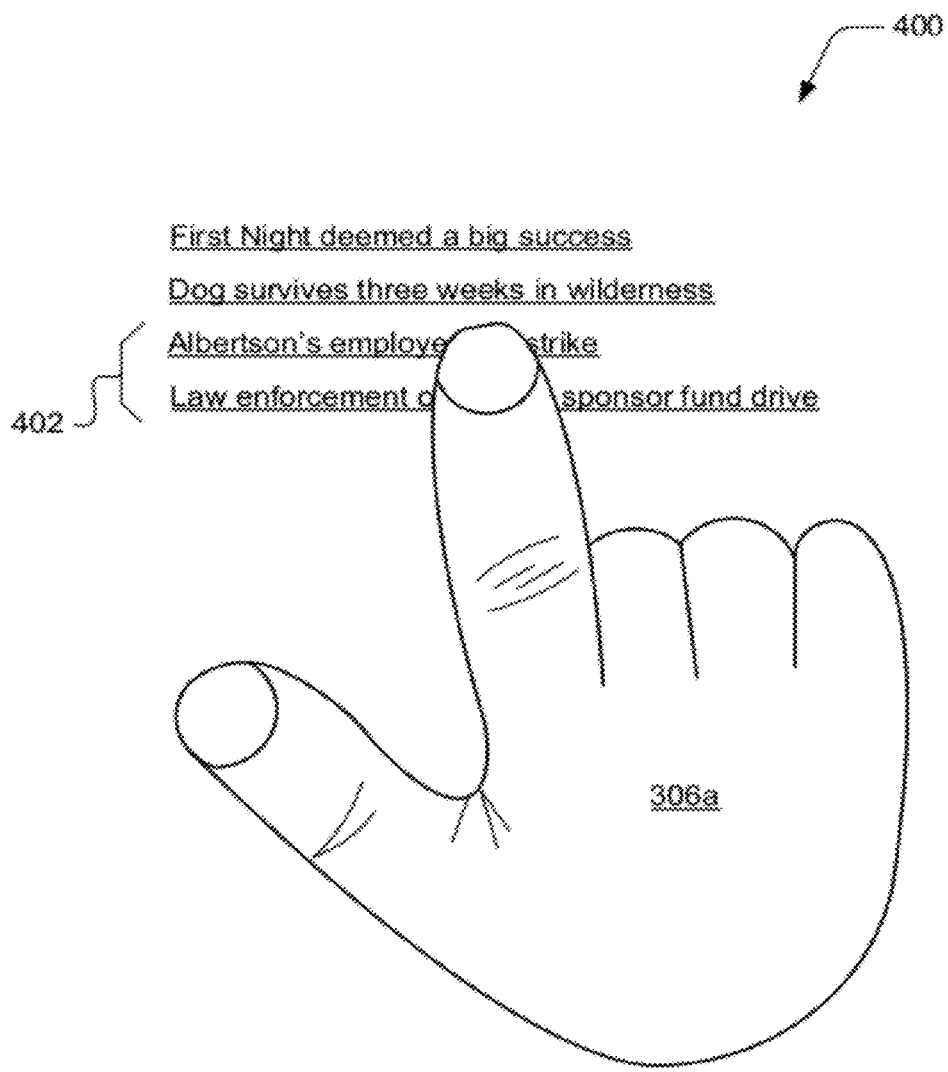
FIG. 4 illustrates aspects of target disambiguation in accordance with one or more embodiments.
Figure 5:
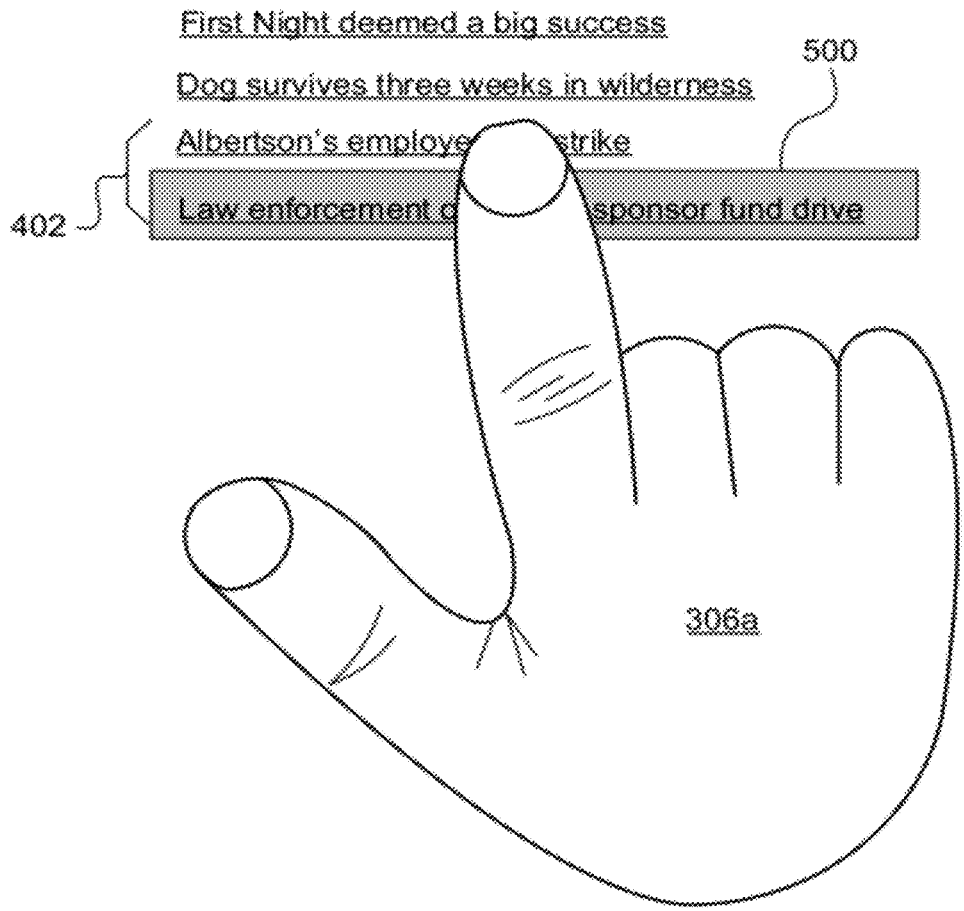
FIG. 5 illustrates aspects of target disambiguation in accordance with one or more embodiments.

As an example, consider FIG. 4 which illustrates an enlarged area of FIG. 3, generally at 400, in accordance with one or more embodiments. In this example, note that there are four links and that the user's hand 306a has touch-selected two links, shown generally at 402, as by placing their finger over the links and touching the display device. Assume further, in this example, that the predominate portion of the user's finger resides over the bottom-most link. However, because at least a portion of the user's finger resides over the top-most link at 402, an ambiguity arises as to which link the user has intended to select. To facilitate resolution of the ambiguity, the target disambiguation module can provide one or more visual indicia to allow the user to ascertain what the Web browser believes the user's selection to be. As an example, consider FIG. 5.

Figure 6:
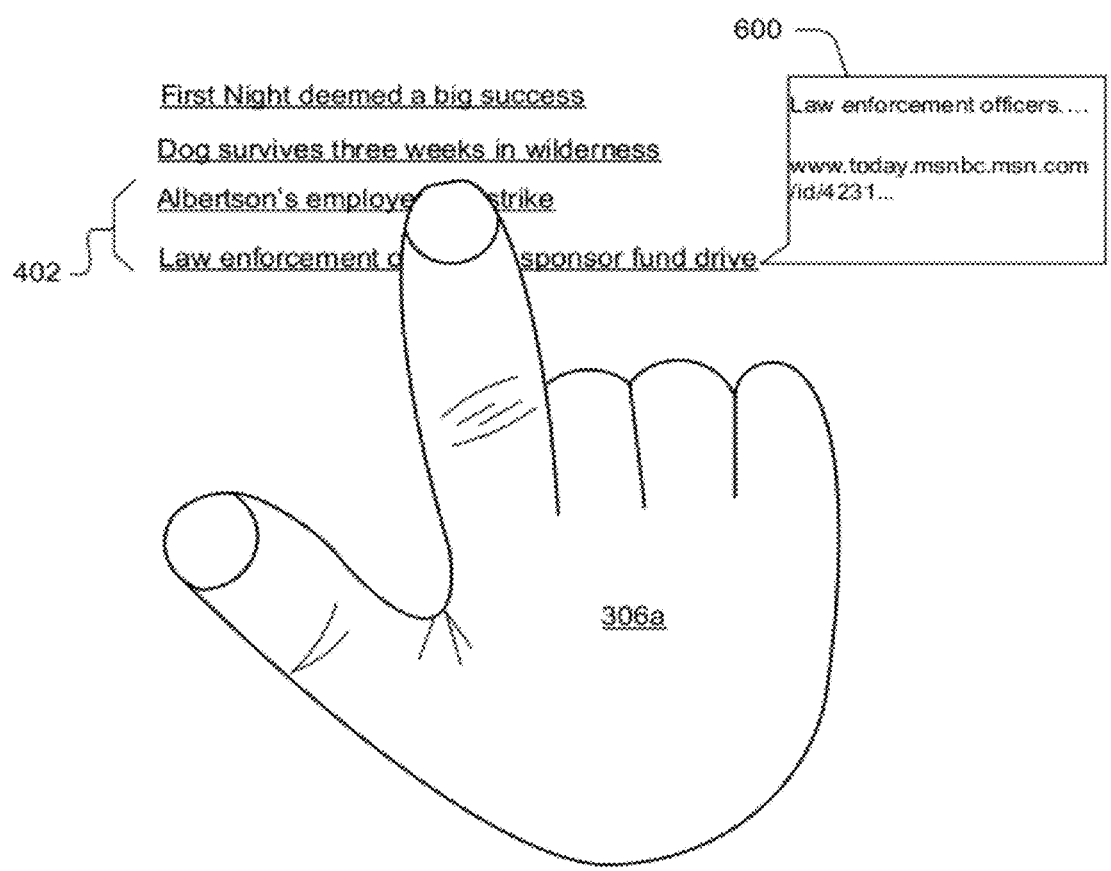
FIG. 6 illustrates aspects of target disambiguation in accordance with one or more embodiments.

There, visual indicia in the form of a highlight 500 is provided to inform the user of what the Web browser believes the user's selection to be. If the user's selection, as conveyed by the highlight 500, is incorrect, the user can move their finger to the correct selection. For example, if the user had intended to select the top-most link at 402, the user can move their finger up to the correct selection, as by rocking or sliding. At this point, the top-most link will be highlighted and, by removing their finger, the link selection process can be completed as by navigating the Web browser to the selected link. Other visual indicia can be utilized as well. As an example, consider FIG. 6.

Figure 7:
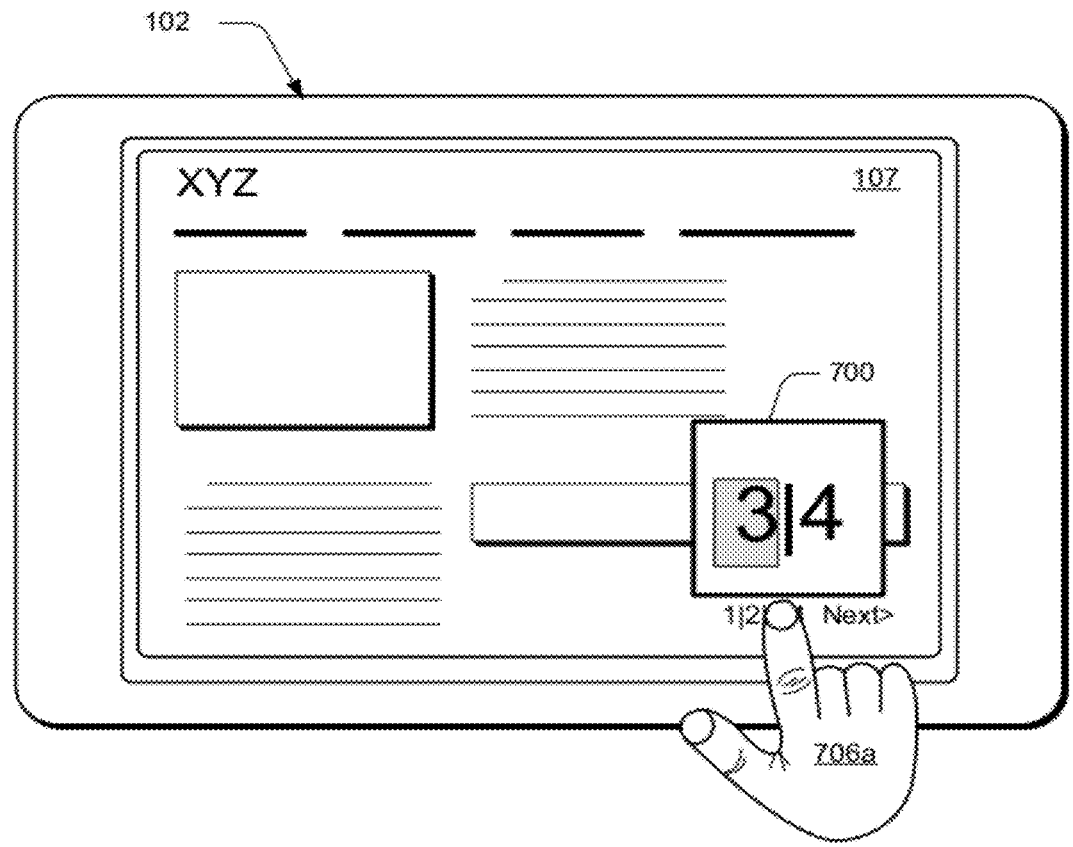
FIG. 7 illustrates aspects of target disambiguation in accordance with one or more embodiments.

There, visual indicia in the form of a tool tip 600 is displayed to inform the user of what the Web browser believes the user's selection to be. Any suitable type of information can be conveyed by the tool tip. In the illustrated and described example, a title and a URL associated with the user's selection is displayed. If the user's selection, as conveyed by the tool tip 600, is incorrect, the user can move their finger to the correct selection. For example, if the user had intended to select the top-most link at 402, the user can move their finger up to the correct selection, as by rocking or sliding their finger. At this point, the top-most link will have a tool tip displayed (with the corresponding information) and, by removing their finger, the link selection process can be completed as by navigating the Web browser to the selected link. Other visual indicia can be utilized as well. As an example, consider FIG. 7.

There, visual indicia in the form of a magnified user interface element 700 is displayed to inform the user of what the Web browser believes the user's selection to be. In the illustrated and described example, two underlying elements have been selected by the user's hand at 706a. Specifically, items "3" and "4" have been selected. Correspondingly, the magnified user interface element 700 displays, for the user, the underlying selection and what the browser believes the user's selection to be. In this particular example, the "3" is visually highlighted within the magnified user interface element to inform the user that the browser believes that element "3" has been selected. If the user's selection, as conveyed by the magnified user interface element 700, is incorrect, the user can move their finger to the correct selection. For example, if the user had intended to select element "4", the user can move their finger to correct the selection, as by rocking or sliding their finger. At this point, element "4" will be highlighted within the magnified user interface element 700 and, by removing their finger, the element selection process can be completed as by navigating the Web browser to the selected element.

It is to be appreciated and understood that the visual indicia described above can be used in combination with one another. For example, visual indicia can combine both the highlighting approach of FIG. 5 with the tool tip of FIG. 6, and the like.

Figure 8:
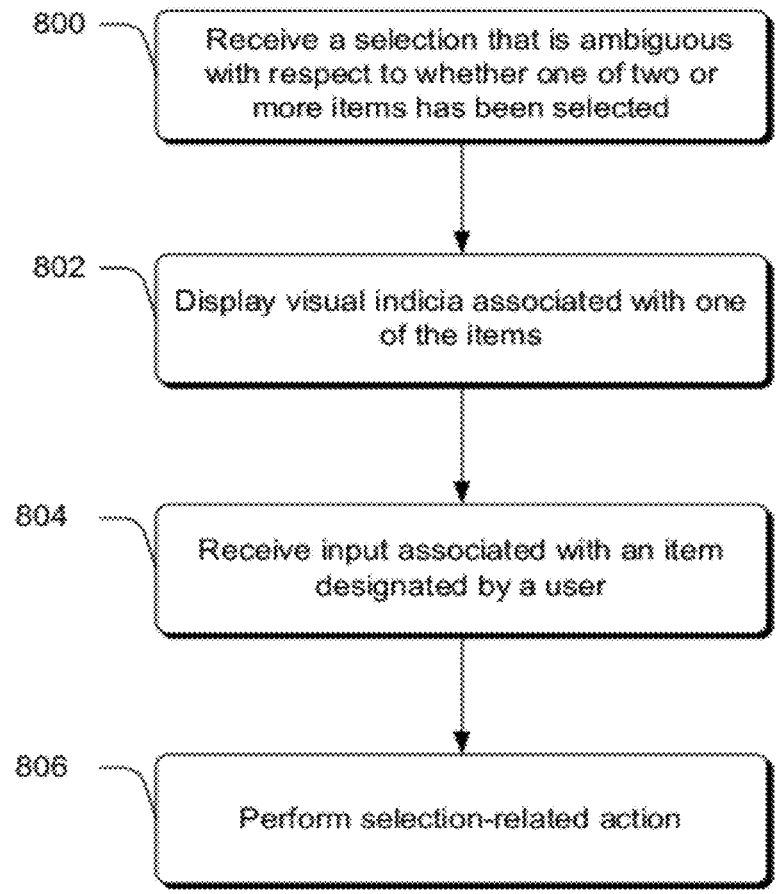
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be performed by a suitably-configured web browser, such as the one described above.

Step 800 receives a selection that is ambiguous with respect to whether one of two or more items has been selected. This step can be performed in any suitable way. For example, selection ambiguity can be determined by ascertaining that a selection profile has characteristics that are associated with an ambiguity in item selection. For example, in at least some embodiments, this step can be performed by receiving the selection by way of touch-screen functionality, and ascertaining the selection profile, e.g. the region on the screen that is physically engaged by a user's finger, selects two or more items. Selection can, however, be performed in manners other than touch-screen functionality, examples of which are provided above. In addition, any suitable type of items can be selected including, by way of example and not limitation, links, images, and the like. Step 802 displays a visual indicia associated with one of the items. The visual indicia is designed to inform a user making the selection of an ambiguity with respect to the selected items. Specifically, the visual indicia can be provided by an associated application to inform the user that the application believes that the user has selected an individual item of the two or more items that appear to have been selected. Any suitable type of visual indicia can be utilized, examples of which are provided above.

Step 804 receives input associated with an item designated by a user. This step can be performed in any suitable way. For example, based on the display of the visual indicia, if the visual indicia indicates the item that the user intended to select, the item designated by the user in this step would be the same item relative to which the visual indicia was displayed. If, on the other hand, based on the display of the visual indicia, the visual indicia indicates an item that a user did not intend to select, the user can correct their selection to designate the intended item. In this case, the item designated by the user in step 804 would be an item other than one relative to which the visual indicia was displayed. The input received in step 804 can be an input that completes the user's selection such as, by way of example and not limitation, lifting a finger off of the touch screen in touch screen scenarios.

Step 806 performs a selection-related action. The step can be performed in any suitable way. For example, in touch-screen/web browser scenarios, the step can be performed by performing an associated navigation.

Having discussed in multiple target acquisition, consider now a discussion of selection latency and how it can be used to initiate target disambiguation.

Selection Latency

As noted above, one way that the target disambiguation process can be initiated is through so-called selection latency. The idea behind selection latency is that if a user selects a particular item, as by touch-selecting the item, and their finger lingers too long over the item, it may be implied that the user has made an unintended selection. As such, in these situations, the target disambiguation process can be initiated and the various visual indicia described above can be presented to assist the user in making a selection.

Figure 9:
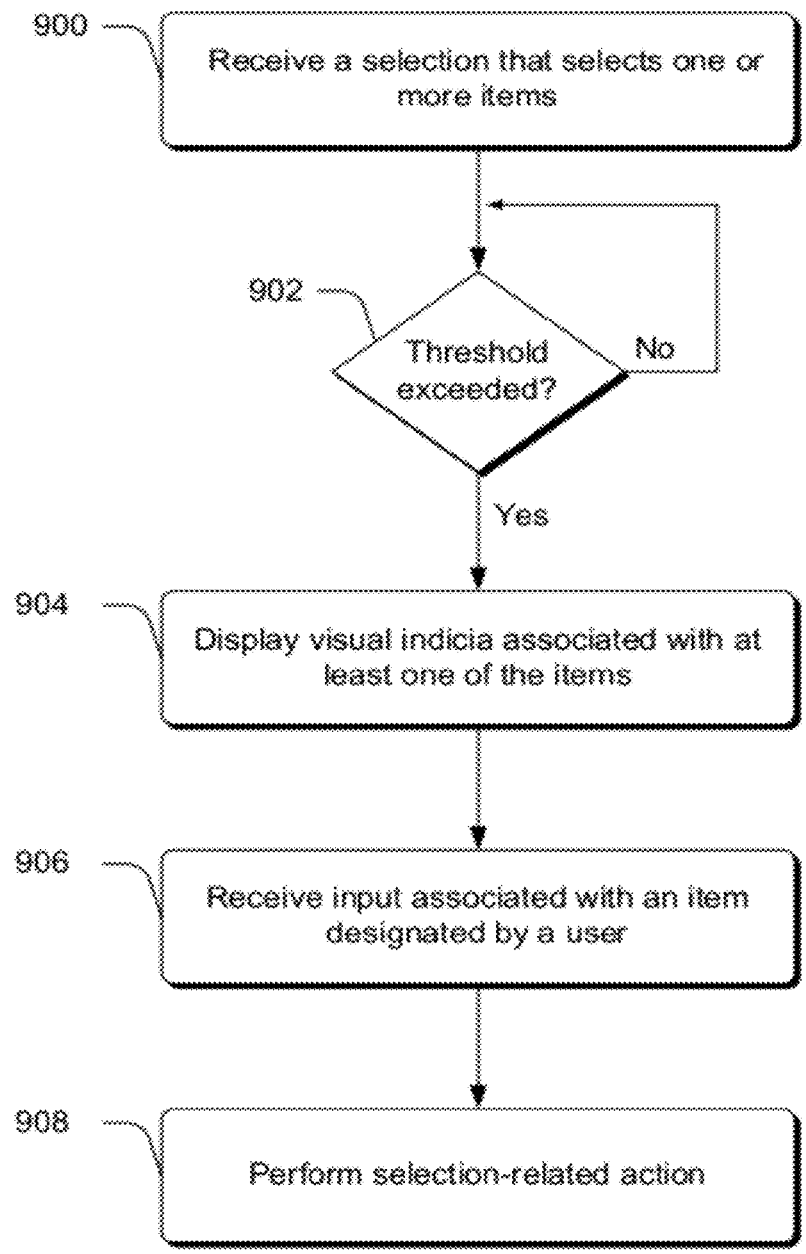
FIG. 9 is a flow diagram that describes steps in a method in accordance with one or more embodiments.

FIG. 9 is a flow diagram that describes steps in a method in accordance with one or more embodiments. The method can be performed in connection with any suitable hardware, software, firmware, or combination thereof. In at least some embodiments, the method can be performed by a suitably-configured web browser, such as the one described above.

Step 900 receives a selection that selects one or more items. This step can be performed in any suitable way. For example, in at least some embodiments, this step can be performed by receiving the selection by way of touch-screen functionality. Selection can, however, be performed in manners other than touch-screen functionality, examples of which are provided above. In addition, any suitable type of items can be selected including, by way of example and not limitation, links, images, and the like. Step 902 ascertains whether selection completion has exceeded a time threshold. Any suitable time threshold can be utilized. For example, a time threshold of between 1-2 seconds may be employed. If the time threshold has not been exceeded and the user has not completed their selection, the method loops back to monitor the time threshold. If, on the other hand, the time threshold has been exceeded, step 904 displays visual indicia associated with at least one of the item or items selected. The visual indicia is designed to provide a user making the selection more information about their selection. Any suitable type of visual indicia can be utilized, examples of which are provided above.

Step 906 receives input associated with an item designated by a user. This step can be performed in any suitable way. For example, based on the display of the visual indicia, if the visual indicia indicates the item that the user intended to select, the item designated by the user in this step would be the same item relative to which the visual indicia was displayed. If, on the other hand, based on the display of the visual indicia, the visual indicia indicates an item that a user did not intend to select, the user can correct their selection to designate the intended item. In this case, the item designated by the user in step 906 would be an item other than one relative to which the visual indicia was displayed.

Step 908 performs a selection-related action. This step can be performed in a suitable way. For example, in touch-screen/ web browser scenarios, the step can be performed by performing an associated navigation.

Having discussed an example selection latency embodiment, consider now a discussion of target disambiguation techniques that utilize a geometric-based approach to define when to initiate target disambiguation and terminate target disambiguation.

Using Geometry to Initiate/Terminate Target Disambiguation

Figure 10:
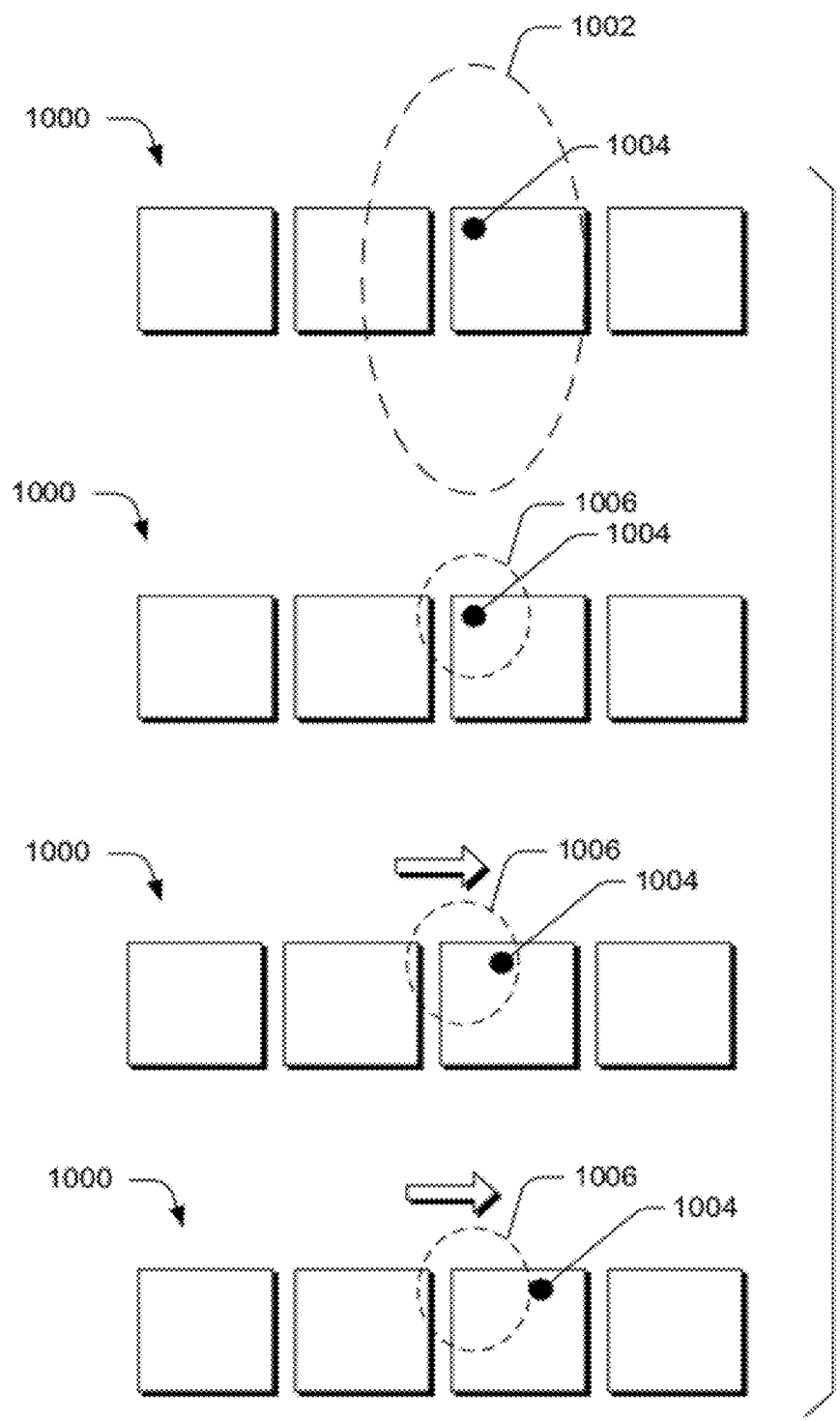
FIG. 10 illustrates aspects of target disambiguation in accordance with one or more embodiments.

In one or more embodiments, geometry can be utilized to define when to initiate and terminate target disambiguation. As an example, consider FIG. 10.

There, a collection of user-selectable items is shown generally at 1000. In the illustrated example, assume that the items correspond to items that might be presented on a webpage. In this particular example, the collection includes four selectable items each of which is represented by a square. Each row of items represents the same items at a different time or state, as will be described below.

With respect to the top-most row, assume that a user has made a touch-selection relative to the items. The corresponding area of an associated touchscreen that is physically engaged by the user's finger is represented by foot print 1002. Footprint 1002 defines a so-called target point 1004 that serves as a basis of geometric calculations that determine when to initiate and terminate target disambiguation.

Referring now to the second row of items, a geometric shape 1006 is defined to include the target point. Any suitable type of geometric shape can be utilized. For example, in at least some embodiments, the geometric shape can reside in the form of a circle with a fixed radius. In one or more embodiments, a radius in the range from between about 6-8 millimeters can be utilized. Alternately, the geometric shape can be an oval, such as footprint 1002. Note that geometric shape 1006 overlaps with two objects, thus leading to a selection ambiguity. In at least some embodiments, dimensions of the geometric shape such as, for example, a circle's radius, can be set on a per-user basis, based on the size of the corresponding area that is physically engaged by a user's finger. As an example, individuals with larger fingers would likely have a larger geometric shape than individuals with smaller fingers.

Assume now the user moves their finger in the direction of the arrow near the third row of items. As such, target point 1004 moves a corresponding distance. In the illustrated and described embodiment, geometric shape 1006 remains fixed in position as defined by the user's initial touch engagement. While the target point is within the boundary of the geometric shape 1006, the above-described target disambiguation techniques can be employed.

Assume now that the user has moved their finger, and correspondingly target point 1004, to a location that is outside the boundary of geometric shape 1006. This is diagrammatically represented in the fourth row of items. In one or more embodiments, when this occurs, item selection for the underlying items can be terminated. The assumption here is that if a user moves their finger far enough away from their initial placement, items that underlie their finger are not intended to be selected.

Figure 11:
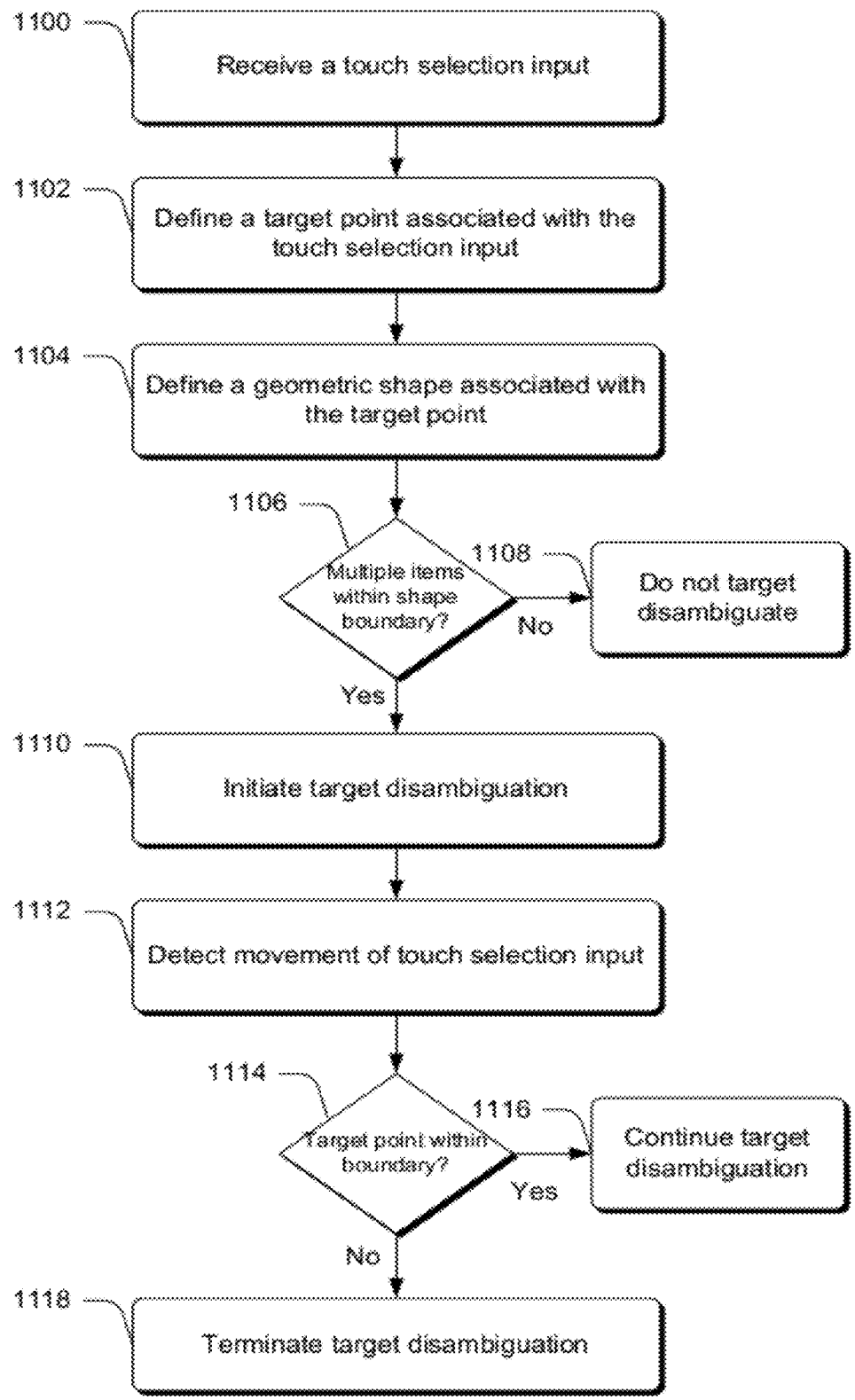
FIG. 11 is a flow diagram that describes steps in a method in accordance with one or more embodiments.

FIG. 11 is a flow diagram that describes steps in a method in accordance with one or more embodiments. The method can be performed in connection with any suitable hardware, software, firmware, or combination thereof. In at least some embodiments, the method can be performed by a suitably-configured web browser, such as the one described above.

Step 1100 receives a touch selection input. Responsive to receiving the touch selection input, step 1102 defines a target point associated with the touch selection input. This step can be performed in any suitable way an example of which is provided above. Step 1104 defines a geometric shape associated with the target point. An example of how this can be done is provided above. Step 1106 ascertains whether multiple items are contained within the shape's boundary. If multiple items are not within the shape's boundary, step 1108 does not initiate target disambiguation. If, on the other hand, multiple items are within the shape's boundary, step 1110 initiates target disambiguation. Examples of target disambiguation techniques are described above.

Step 1112 detects movement of the touch selection input. This can be done, for example, by detecting movement of a user's finger relative to the originally-placed location. When this occurs, the initially-defined target point moves with the finger as well. Step 1114 ascertains whether the target point is within the shape's boundary. If the target point is within the shape's boundary, step 1116 continues target disambiguation. The method can then return to step 1112 or can terminate responsive to a user making a particular selection. If, on the other hand, the target point is not within the shape's boundary, step 1118 terminates target disambiguation.

In one or more embodiments, when target disambiguation is terminated by virtue of movement of the target point outside of the shape's boundary, panning functionality can be enabled to allow the user to pan through displayed content.

In one or more embodiments, target disambiguation can be terminated in other ways. For example, the velocity of finger movement can be used to determine whether to continue or terminate target disambiguation. Specifically, quicker finger movements across the touch screen can result in panning, while slower finger movements can result in target disambiguation, where appropriate.

Having described using geometry to initiate/terminate target disambiguation, consider now a discussion of example device that can be utilized to implement one or more embodiments.

Example Device

Figure 12:
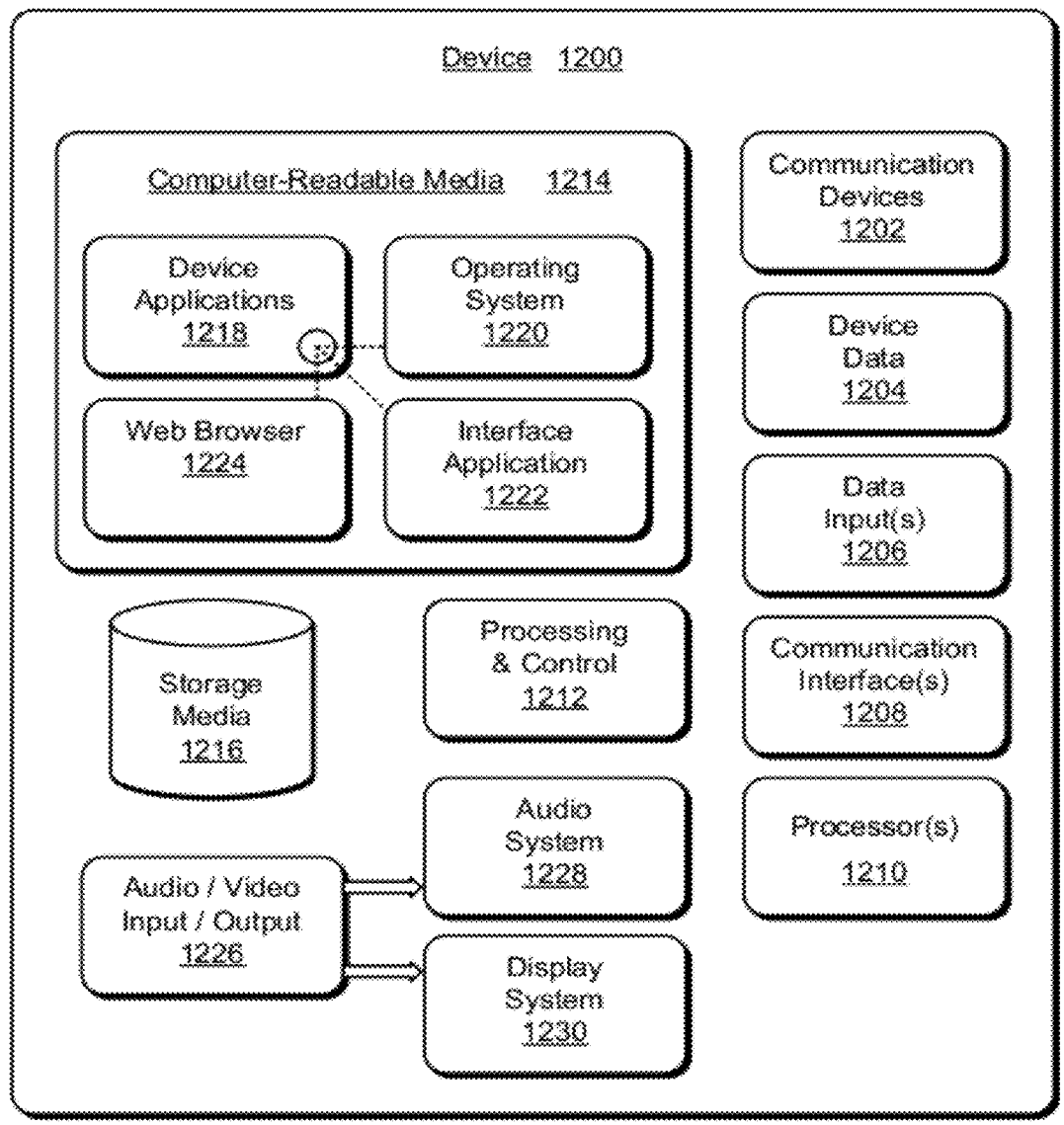
FIG. 12 illustrates an example computing device that can be utilized to implement various embodiments described herein.

FIG. 12 illustrates various components of an example device 1200 that can be implemented as any type of portable and/or computer device as described with reference to FIGS. 1 and 2 to implement embodiments of the gesture techniques described herein. Device 1200 includes communication devices 1202 that enable wired and/or wireless communication of device data 1204 (e.g., received data, data that is being received, data scheduled for broadcast, data packets of the data, etc.). The device data 1204 or other device content can include configuration settings of the device, media content stored on the device, and/or information associated with a user of the device. Media content stored on device 1200 can include any type of audio, video, and/or image data. Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208 that can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like) which process various computer-executable or readable instructions to control the operation of device 1200 and to implement the gesture embodiments described above. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable media 1214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable media 1214 provides data storage mechanisms to store the device data 1204, as well as various device applications 1218 and any other types of information and/or data related to operational aspects of device 1200. For example, an operating system 1220 can be maintained as a computer application with the computer-readable media 1214 and executed on processors 1210. The device applications 1218 can include a device manager (e.g., a control application, software application, signal processing and control module, code that is native to a particular device, a hardware abstraction layer for a particular device, etc.). The device applications 1218 also include any system components or modules to implement embodiments of the gesture techniques described herein. In this example, the device applications 1218 include an interface application 1222 and a web browser 1224 that are shown as software modules and/or computer applications. The web browser 1224 is representative of software that is used to provide web browsing functionality, including an interface with a device configured to capture gestures, such as a touch screen, track pad, camera, and so on.

Device 1200 also includes an audio and/or video input-output system 1226 that provides audio data to an audio system 1228 and/or provides video data to a display system 1230. The audio system 1228 and/or the display system 1230 can include any devices that process, display, and/or otherwise render audio, video, and image data. Video signals and audio signals can be communicated from device 1200 to an audio device and/or to a display device via an RF (radio frequency) link, S-video link, composite video link, component video link, DVI (digital video interface), analog audio connection, or other similar communication link. In an embodiment, the audio system 1228 and/or the display system 1230 are implemented as external components to device 1200. Alternatively, the audio system 1228 and/or the display system 1230 are implemented as integrated components of example device 1200.

CONCLUSION

Various embodiments enable target disambiguation and correction. In one or more embodiments, target disambiguation includes an entry mode in which attempts are made to disambiguate one or more targets that have been selected by a user, and an exit mode which exits target disambiguation. Entry mode can be triggered in a number of different ways including, by way of example and not limitation, acquisition of multiple targets, selection latency, a combination of multiple target acquisition and selection latency, and the like. Exit mode can be triggered in a number of different ways including, by way of example and not limitation, movement of a target selection mechanism outside of a defined geometry, speed of movement of the target selection mechanism, and the like.

In one or more embodiments, target disambiguation techniques utilize a geometric-based approach to define when to initiate target disambiguation and terminate target disambiguation.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A method comprising:
displaying, via an application, a plurality of links that are part of a webpage;
receiving, via the application, a selection that is ambiguous with respect to whether one of two or more of the plurality of links has been selected;
ascertaining that a selection profile of the selection overlaps two or more of the plurality of links, the selection profile defined as a region of a screen that is physically engaged by the selection;
responsive to the ascertaining that the selection profile overlaps two or more of the plurality of links, determining that the selection at least partially visually occludes one of the two or more links;
displaying visual indicia associated only with the at least partially visually occluded one of the two or more links;
receiving input associated with a link designated by a user; and
performing a selection-related action responsive to receiving the input associated with the link designated by the user;
wherein the visual indicia comprises a highlight or a tooltip.

2. The method of claim 1, wherein said receiving a selection is performed by way of touch-screen functionality.

3. The method of claim 1, wherein said application comprises a web browser.

4. The method of claim 1, wherein said input associated with the link designated by the user comprises input that completes a link selection.

5. The method of claim 1, wherein said performing comprises performing an associated navigation via the application.

6. The method of claim 1, wherein the visual indicia comprises a highlight.

7. The method of claim 1, wherein the visual indicia comprises a tool tip.

8. The method of claim 1, wherein the visual indicia comprises a magnified user interface element.

9. A system comprising:
one or more processors: and
one or more memories storing instructions that, responsive to execution by the one or more processors, cause the one or more processors to perform operations comprising: displaying, via an application, links that are part of a webpage;
receiving, via the application, a user selection that selects one or more of the links;
ascertaining whether selection completion has exceeded a time threshold;
responsive to the time threshold being exceeded, displaying visual indicia associated with only one of the one or more links based on the user selection;
responsive to detecting movement associated with the selection, maintaining display of the visual indicia associated with the at least one of the one or more links until a speed of the movement associated with the selection exceeds a threshold speed;
receiving input associated with a link designated by the user; and
responsive to receiving input associated with the link designated by the user, performing a selection-related action;
wherein the visual indicia comprises a highlight or a tooltip.

10. The system of claim 9, wherein said receiving a selection is performed by way of touch-screen functionality.

11. The system of claim 9, wherein said application comprises a web browser.

12. The system of claim 9, wherein said input associated with the link designated by the user comprises input that completes a link selection.

13. The system of claim 9, wherein said performing comprises performing an associated navigation via the application.

14. The system of claim 9, wherein the visual indicia comprises a tool tip.

15. A system comprising:
one or more processors; and
one or more memories storing instructions that, responsive to execution by the one or more processors, cause the one or more processors to perform operations comprising:
displaying multiple links that are part of a webpage;
receiving a touch selection input of one or more of the multiple links that are part of the webpage;
defining a target point associated with the touch selection input;
defining a geometric shape associated with the target point, the geometric shape having dimensions based on a size of a corresponding area that is physically engaged by the received touch selection input;
ascertaining whether multiple links are contained within a boundary of the geometric shape;
responsive to multiple links being within the boundary of the geometric shape, initiating a target disambiguation technique to ascertain which of the multiple links is intended for selection;
detecting movement of the touch selection input, the movement causing the target point to move;
ascertaining whether the target point is within the boundary of the geometric shape;
responsive to the target point vexing within the boundary of the geometric shape, continuing the target disambiguation technique; and
responsive to the target point not being within the boundary of the geometric shape, terminating the target disambiguation technique;
wherein the visual indicia comprises a highlight or a tooltip.

16. The system claim 15, wherein the geometric shape comprises a circle.

17. The system claim 15, wherein the geometric shape comprises a circle having a radius from between about 6-8 millimeters.

18. The system claim 15, wherein the geometric shape has a dimension that can be set on a per-user basis, based on a size of a corresponding area that is physically engaged by a user's finger.

19. The system claim 15, wherein the target disambiguation technique comprises displaying visual indicia associated with one of the links.

20. The system claim 15, further comprising, after terminating the target disintegration technique enabling panning functionality.

* * * * *